United States Patent [19]
Akiyama et al.

[11] Patent Number: 5,883,720
[45] Date of Patent: Mar. 16, 1999

[54] METHOD OF MEASURING A FILM THICKNESS OF MULTILAYER THIN FILM

[75] Inventors: Tetsuya Akiyama; Eiji Ohno, both of Osaka; Nobuo Akahira, Kyoto, all of Japan

[73] Assignee: Matsushita Electric Industrial Co., Ltd., Osaka, Japan

[21] Appl. No.: 883,530

[22] Filed: Jun. 26, 1997

[30] Foreign Application Priority Data

Jun. 26, 1996 [JP] Japan .................................. 8-166026
Mar. 6, 1997 [JP] Japan .................................. 9-051241

[51] Int. Cl.$^6$ .................................................. G01B 11/06
[52] U.S. Cl. .................................................. 354/382
[58] Field of Search .................................. 356/381, 382, 356/328; 250/559.27

[56] References Cited

U.S. PATENT DOCUMENTS

| | | | |
|---|---|---|---|
| 5,410,411 | 4/1995 | Uchida et al. | 250/559.27 |
| 5,493,401 | 2/1996 | Horie et al. | 356/382 |
| 5,604,581 | 2/1997 | Liu et al. | 356/382 |
| 5,724,145 | 3/1998 | Kondo et al. | 356/382 |

*Primary Examiner*—Richard A. Rosenberger
*Attorney, Agent, or Firm*—Merchant, Gould, Smith, Edell, Welter & Schmidt, P.A.

[57] ABSTRACT

A method of manufacturing an optical information recording medium comprising the steps of: forming a plurality of component thin films on a substrate or on a sample at a predetermined film-forming speed and within a predetermined film-forming time in sequence; measuring spectral reflectance of the multilayer thin film formed on the substrate or on the sample; comparing the measured value of the spectral reflectance and the standard value of the spectral reflectance to detect the difference between them; compensating at least one of the film-forming speed and the film-forming time based on the detected difference; and forming a plurality of thin films based on the compensated film-forming speed and with the compensated film-forming time. Consequently, a thickness of each component thin film of the optical information recording medium can be measured easily and production loss in measuring a film-forming speed can be decreased.

31 Claims, 6 Drawing Sheets

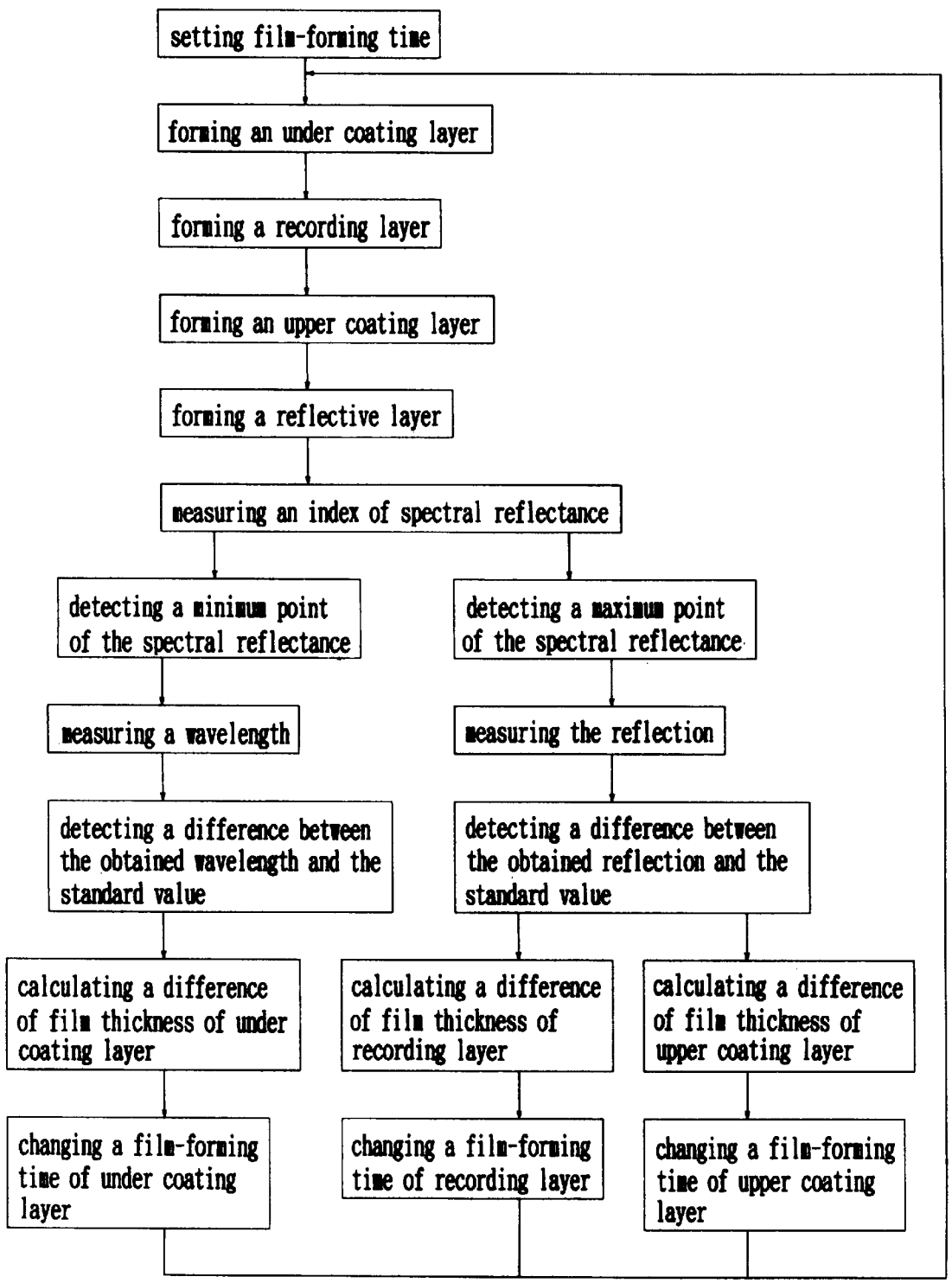
F I G. 1

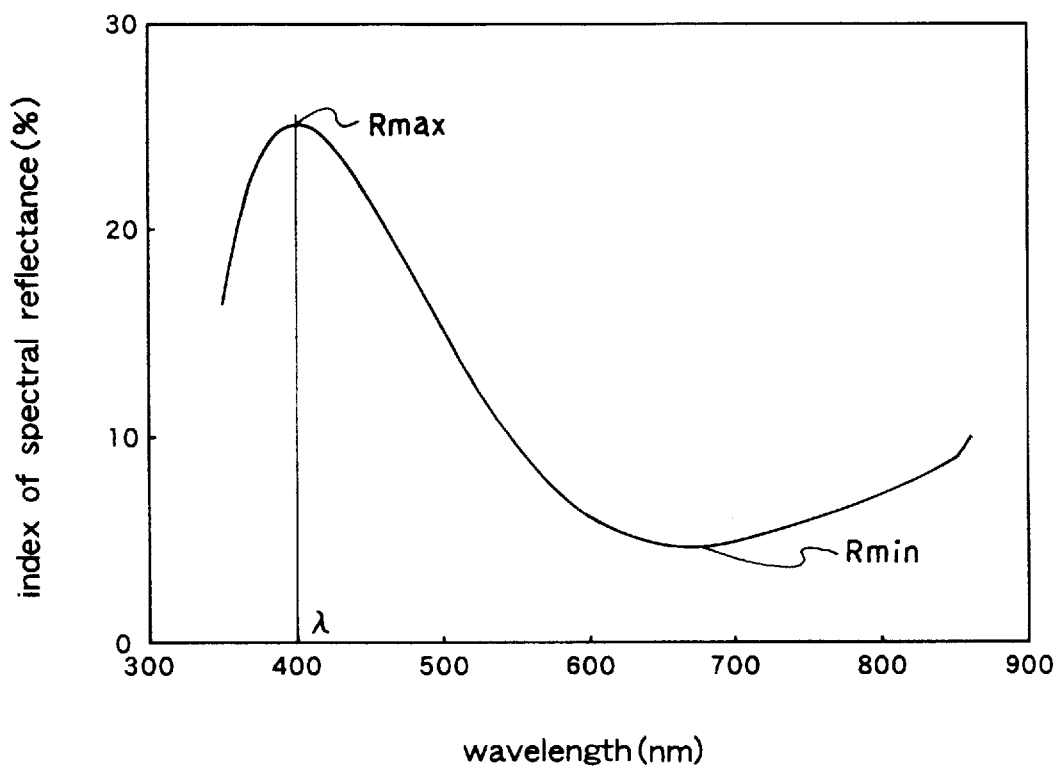
F I G. 6

METHOD OF MEASURING A FILM THICKNESS OF MULTILAYER THIN FILM

FIELD OF THE INVENTION

The present invention relates to a method of measuring a film thickness of multilayer thin film composed of a plurality of thin films having different optical constants respectively formed on the substrate, and a method of manufacturing an optical information recording medium using the method of measuring a film thickness, and a manufacturing apparatus for an optical information recording medium.

BACKGROUND OF THE INVENTION

Recently, a reloadable optical information recording medium, the so-called erasing type, has been investigated as a memory having high volume and high density. An example of the erasing type of the optical information recording medium comprises a thin film whose phase is changed between the amorphous state and the crystalline state functioning as a recording layer. With the erasing type of the optical information recording medium, an information is recorded or erased by thermal energy when it is irradiated by a laser beam.

An alloy film such as GeSbTe, GeSbTeSe, InSb, InSbTe or InSbTeAg having Ge, Sb, Te or In as a main component is well-known as a phase-changing material for the recording layer. In general, an information is recorded by changing some parts of the recording layer to the amorphous state to make marks, and an information is erased by crystallizing the marks. The recording layer is heated above the melting point to form the amorphous state and then is cooled down at the predetermined rate which is faster than a certain speed. On the other hand, the recording layer is heated above the crystallization temperature but lower than the melting point to be crystallized.

In general, a dielectric layer is formed on upper and lower sides of the recording layer. There are three objectives in providing the dielectric layer. First, the dielectric layer is provided to protect the substrate from the heat of the recording layer that rises higher than the melting point momentarily, and prevents deformation and damage of the recording layer. Secondly, in reproducing the information, a sufficient signal strength is desired to be obtained utilizing an optical interference effect. Third, the cooling speed suitable for forming an amorphous mark having a preferable form is desired to be achieved. Therefore, it is required for a dielectric material to have properties such as sufficient heat resistance, large index of refraction and suitable coefficient of thermal conductivity. $ZnS-SiO_2$ is an example of a material that satisfies the above-mentioned conditions.

FIG. 2 is a sectional view showing a configuration of an optical information recording medium 10 which is a typical erasing type. A transparent substrate 1 is disk-like having a central hole 9 and a plurality of toroidal guide grooves 2. On the transparent substrate 1, an under coating layer 3 having a thickness of about 150 nm composed of a thin film of $ZnS-SiO_2$, a recording layer 4 having a thickness of about 20 nm composed of an alloy film of GeSbTe, an upper coating film 5 having a thickness of about 40 nm composed of thin film of $ZnS-SiO_2$, and a reflective layer 6 having a thickness of about 100 nm composed of Al alloy thin film are formed in sequence by a sputtering method. Further, on the reflective layer 6 a resin protective layer 7 is formed. The recording property of the optical information recording medium depends greatly on the thickness of each film, especially, an irregularity of thickness of the under coating layer 3, the recording layer 4 and the upper coating layer 5 affects the recording property of the optical information recording medium greatly. Consequently, it is required to control the thickness of each film closely in manufacturing an optical information recording medium.

Previously, in a step of forming a thin film layer of the optical information recording medium 10 including essential parts such as an under coating layer 3, a recording layer 4 and an upper coating layer 5, a method of forming a film is conducted in the following manner:

A sample of each film which is formed in a predetermined time by a sputtering method under certain conditions is prepared periodically as a control for the thickness of each film. The thickness of each film is measured by ellipsometer. The time required for forming the film is compensated to obtain the desirable film thickness based on the obtained film-forming speed.

However, according to the above-mentioned conventional methods, there are some problems to be solved. It is necessary to prepare the same number of samples for measuring the film-forming speed as that of each thin film layer composing the optical information recording medium 10, and also to measure the thickness of the each film. As a result, the process is complicated, and accordingly it requires a longer time for forming the film. In a case when a sample is manufactured by batch sputtering, an actual optical information recording medium is not manufactured, and accordingly the production loss in measuring the film-forming speed is great. In addition to that, it is required to change the manufacturing conditions tentatively for preparing the sample. Each sample of the film is prepared so as to have a preferable thickness which is suitable to be measured by ellipsometer. As a result, the film-forming speed is calculated using the sample whose film thickness is different from that of the optical information recording medium, and therefore the resultant sample may have an error.

SUMMARY OF THE INVENTION

This invention provides a method of measuring a film thickness of a multilayer thin film that can measure a plurality of thin film layers only with one measurement, a method of manufacturing an optical information recording medium in which the above-mentioned film-thickness measuring method is used that has low production loss in making a sample for measuring the film-forming speed and does not require the production condition to be changed temporarily, and also an optical information recording medium apparatus.

The method of measuring a film thickness of multilayer thin film of this invention is measuring a film thickness of a plurality of thin films that have different optical constants respectively formed on the substrate. The method of this invention comprises: measuring spectral reflection of the above-mentioned multilayer thin film, comparing the measured value with the predetermined standard value, and calculating a thickness of each film based on the difference between the measured value and the predetermined standard value.

According to the method, a film thickness of a plurality of thin film layers can be measured with only one measurement, therefore, the time required for measuring a film thickness can be shortened. In addition to that, a film thickness can be measured in manufacturing an optical information recording medium, therefore, it is effective when a film is formed by a batch sputtering method.

In the above-mentioned method, it is preferable that an extremal value of the spectral reflection of multilayer thin film is detected, and a thickness of each film is calculated based on the difference between at least one of the reflection in the extremal value of the spectral reflection and the standard value, and the wavelength in the external value of the spectral reflection and the standard value respectively.

Accordingly, it becomes easy to specify the measurement results and the standard value of reflection and the wavelength. Consequently, the detecting accuracy of the comparison between the measurement results of the reflection and the standard value of the reflection, and the measurement results of the wavelength and the standard value of the wavelength can be increased. Also, the detecting accuracy of the difference between the measurement results of the reflection and the standard value of the reflection, and the difference between the measurement results of the wavelength and the standard value of the wavelength, can be increased.

It is preferable that a thickness of a thin film positioned as the first layer from the side of measuring the spectral reflection of the multilayer thin film is calculated based on the difference between the wavelength in a minimum value or a maximum value of the spectral reflection and the standard value of the wavelength.

It is preferable that thicknesses of a thin films positioned as the second line and the third line from the side of measuring the spectral reflection of the multilayer thin film are calculated based on the difference between the reflection in a plurality of maximum values of the spectral reflection and the standard value of the reflection.

A method of manufacturing an optical information recording medium composed of a plurality of thin films having different optical constants respectively formed on the substrate of this invention comprises the steps of: forming the plurality of thin films on the substrate or the sample with the predetermined film-forming speed and within the predetermined film-forming time respectively in sequence; measuring the spectral reflection of the multilayer thin film formed on the substrate or on the sample; comparing the measured value of the spectral reflection and the standard value of the spectral reflection to detect the difference between them; compensating at least one of the predetermined film-forming speed and the predetermined film-forming time based on the detected difference; and forming the plurality of thin films with the compensated film-forming speed, within the compensated film-forming time on the new substrate in sequence.

According to the present invention, a film thickness of a plurality of thin films can be measured with only one measurement by measuring directly a thickness of a film formed on the substrate or a thickness of a film formed on a sample which is formed at the same time when the film is formed on the substrate, using the above-mentioned method of measuring a thickness of the multilayer thin film. As a result, the time required for measuring the film-forming speed can be shortened and the production line can be operated effectively. In addition, unlike the conventional examples, it is not required to prepare a sample for measuring a film-forming speed for each layer, and therefore the production loss can be reduced. Especially, it is very effective when a film is formed by a batch sputtering method.

A method of manufacturing an optical information recording medium composed of a plurality of thin films having different optical constants respectively formed on the substrate comprises the steps of: forming the plurality of thin films on the substrate or the sample with the predetermined film-forming speed and within the predetermined film-forming time respectively in sequence; measuring the spectral reflection of the multilayer thin film formed on the substrate or on the sample; comparing the measured value of the spectral reflection and the standard value of the spectral reflection to detect the difference between them; and judging the quality of the multilayer thin film formed on the substrate based on the detected difference.

According to this aspect, in addition to the effect of the above-mentioned first manufacturing method, a thickness of a film of the manufactured optical information recording medium can be measured directly, and therefore the quality of the manufactured optical information recording medium can be judged. Thus it is possible that an optical information recording medium having a desirable characteristic can be selected.

In the above-mentioned method, it is preferable that an extremal value of the spectral reflection of multilayer thin film is detected, and a thickness of each film is calculated based on the difference between at least one of the reflection in the extremal value of the spectral reflection and the standard value, and the wavelength in the extermal value of the spectral reflection and the standard value.

It is preferable that a thickness of a thin film positioned as the first layer from the side of measuring the spectral reflection of the multilayer thin film is calculated based on the difference between the wavelength in a minimum value or a maximum value of the spectral reflection and the standard value.

It is preferable that thicknesses of thin films positioned as the second layer and the third layer from the side of measuring the spectral reflection of multilayer thin film are calculated based on the difference between the reflection in a plurality of maximum values of the spectral reflection and the standard value.

Further, it is preferable that an interval of each wavelength in measuring the spectral reflection is 10 nm or less.

An apparatus for forming an optical information recording medium composed of a plurality of thin films having different optical constants respectively formed on the substrate comprises: means for forming the plurality of thin films on the substrate or the sample with the predetermined film-forming speed and within the predetermined film-forming time respectively in sequence; means measuring the spectral reflection of the multilayer thin film formed on the substrate or on the sample; means for storing the predetermined standard value of the spectral reflection; means for comparing the measured value of the spectral reflection and the standard value of the spectral reflection to detect the difference between them; and means compensating at least one of the predetermined film-forming speed and the predetermined film-forming time based on the detected difference.

Accordingly, a thickness of film formed on the substrate or on the sample with predetermined film-forming speed, within the predetermined time is measured, and at least one of the film-forming speed or the film-forming time is compensated based on the difference between the measured value and the standard value. Consequently, a thickness of film formed on the subsequent substrates can be made to the predetermined design value. In addition to that, the measured value can be converged to the predetermined design value by repeating the step, as a result, the accuracy of the thickness of each film of the manufactured optical information recording medium can be increased.

Another apparatus of this invention comprises: means for forming the plurality of thin films on the substrate or the sample with the predetermined film-forming speed and within the predetermined film-forming time respectively in sequence; means for measuring the spectral reflection of the multilayer thin film formed on the substrate or on the sample; means for storing the standard value of the predetermined spectral reflection; means for comparing the measured value of the spectral reflection and the standard value of the spectral reflection to detect the difference between them; and means for judging the quality of the multilayer thin film formed on the substrate based on the detected difference.

According to this aspect, in addition to the effect of the above-mentioned first manufacturing method, a thickness of film of the manufactured optical information recording medium can be measured directly. Therefore it is possible that the quality of the manufactured optical information recording medium can be judged and an optical information recording medium having a desirable characteristic can be selected.

In the above-mentioned construction, it is preferable that the manufactured optical information recording medium apparatus comprises means detecting an extremal value of the spectral reflection of the multilayer thin film and means obtaining a thickness of each film based on the difference between at least one of the reflection in the extremal value of the spectral reflection and the standard value, and the wavelength in the extremal value of the spectral reflection and the standard value, as means comparing the measured value and the standard value of the spectral reflection and detecting the difference between them.

Further, it is preferable that the apparatus comprises means estimating a thickness of a thin film positioned as the first layer from the side of measuring the spectral reflection of the multilayer film based on the difference between the wavelength in the minimum value or a maximum value of the spectral reflection and the standard value and means compensating at least one of the film-forming speed and the film-forming time of the film positioned at the first line from the side of the measuring the spectral reflection based on the difference between the estimated value of film thickness and the desirable film thickness.

Further, it is preferable that the manufactured optical information recording medium apparatus comprises means estimating thicknesses of second and third films positioned as the second and third layers from the side of measuring the spectral reflection of the multilayer film based on the difference between the reflection in a plurality of maximum values of the spectral reflection and the standard value and means compensating at least one of the film-forming speed and the film-forming time of the film positioned at the second and third lines from the side of the measuring the spectral reflection based on the difference between the estimated value of film thickness and the desirable film thickness.

Further, it is preferable that an interval of each measured wavelength is 10 nm or less in measuring the spectral reflection.

According to the present invention, the measuring accuracy can be maintained to be about 5%.

BRIEF DESCRIPTION OF THE DRAWINGS

FIG. 1 is a flow chart showing processes of manufacturing an optical information recording medium of first embodiment of this invention.

FIG. 6 is a graph showing the relationship between the measured spectral reflectance of the optical information recording medium and the wavelength of second embodiment of this invention.

THE DETAILED DESCRIPTION OF THE INVENTION

Figure 2:
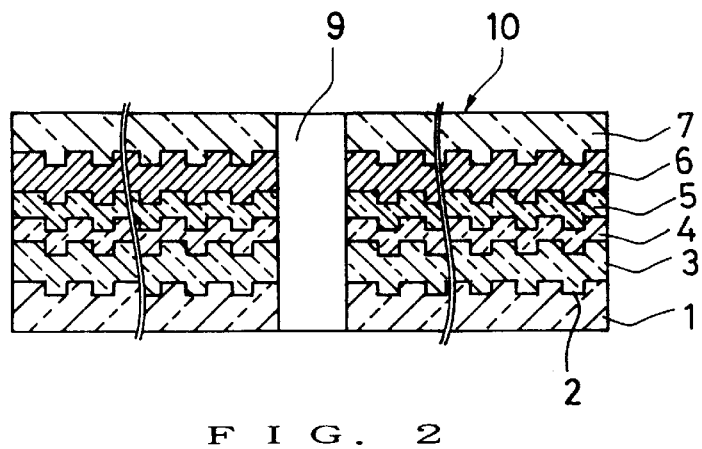
FIG. 2 is asectional view showing the construction of a general optical information recording medium of first embodiment of this invention.

The present invention results from the fact that the spectral reflection characteristic varies with changing a thickness of each film of the multilayer thin film, to find that the wavelength and the reflection in maximum value and minimum value of the spectral reflection change characteristically reacting to the change of a thickness of each film. This invention aims to measure a thickness of one member of a multilayer thin film without destroying the other thin films.

Hereinafter, a method of measuring a thickness of multilayer thin film, a method of manufacturing an optical information recording medium in which the above-mentioned method is employed and an apparatus for manufacturing an optical information recording medium of this invention will be explained, referring to the drawings.

(first embodiment)

Figure 3:
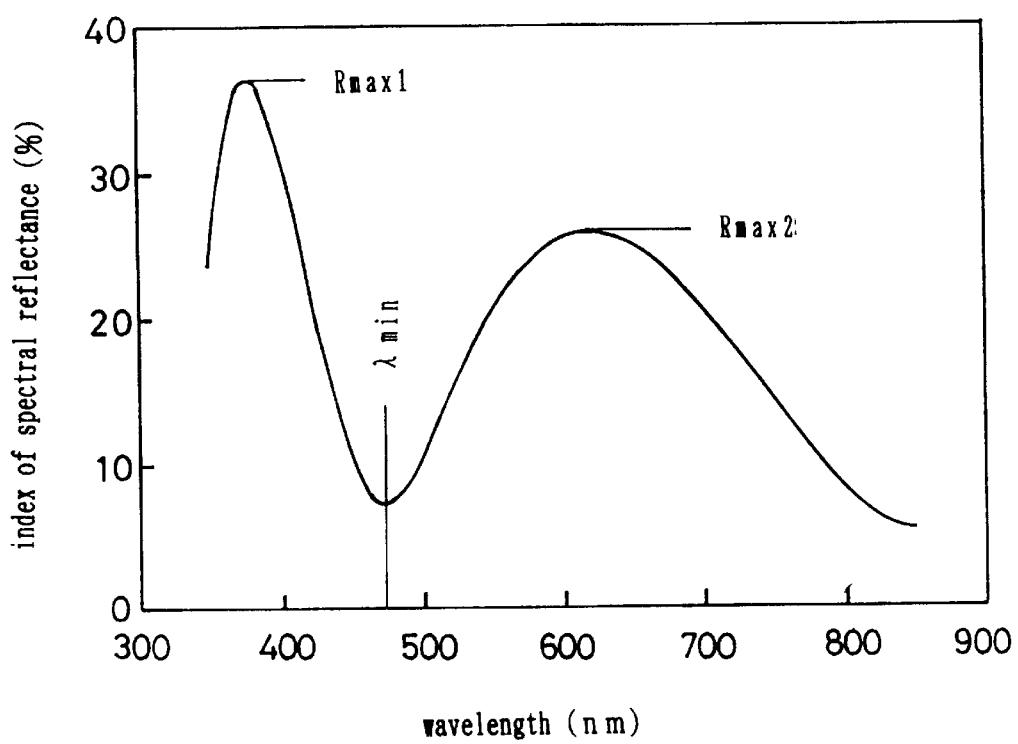
FIG. 3 is a graph showing the relationship between the measured spectral reflectance of the optical information recording medium and the wavelength of first embodiment of this invention.

Referring to FIGS. 1 to 3, the first embodiment concerning a method of measuring a thickness of multilayer film and a method of manufacturing an optical information recording medium in which the above-mentioned method is employed will be explained. FIG. 1 is a flow chart showing steps of a method of manufacturing an optical information recording medium of this invention. FIG. 2 is a sectional drawing showing a general erasing type optical information recording medium. FIG. 3 is a graph showing an example of measurements of spectral reflection obtained by a spectrometer of an optical information recording medium having a construction shown by FIG. 2.

As shown in FIG. 1, the film-forming time of each film is set under predetermined conditions. Then, an under coating layer 3, a recording layer 4, an upper coating layer 5 and a reflection layer 6 are formed on a transparent substrate 1 in sequence according to the predetermined film-forming time of each film. Spectral reflection from a side of the substrate is measured by spectrometer at conditions such that the wavelength is in a range between 350 nm and 860 nm, and the wavelength interval is 5 nm. FIG. 3 shows the results of the measurement.

A minimum value and a maximum value of the spectral reflection are detected according to the obtained results of the measurement. $\lambda$ min which is a wavelength at a minimum value of the spectral reflection is measured and is compared with a predetermined-standard value of the wavelength to obtain a difference, $\Delta\lambda$ min. At the same time, a reflectance Rmax1 and Rmax2 at maximum values of the spectral reflection are measured and are compared with a predetermined-standard value of the reflectance to obtain a difference, ΔRmax1 and ΔRmax2. In this case, the standard value is a wavelength at a minimum value of the spectral reflection and reflectance at a maximum value of the spectral reflection when each film is formed to meet a predetermined design value.

According to the above-mentioned measurements, the thickness of an under coating layer 3, a recording layer 4 and an upper coating layer 5 of optical recording medium 10 are calculated. A method of calculating is as follows. Z(%), a difference between a film thickness of under coating layer 3 and the standard value, that is, 150 nm, X(%), a difference between a film thickness of the recording layer 4 and the standard value, that is, 20 nm and Y(%), a difference between a film thickness of the upper coating layer 5 and the standard value, that is, 40 nm are calculated according to following formulas, 1 to 3.

$$\Delta Rmax1 = aX + bY \qquad (1)$$

$$\Delta Rmax1 - \Delta Rmax2 = cX + dY \qquad (2)$$

$$\Delta \lambda min = eZ \qquad (3)$$

[Formula]

The formulas are derived as follows. When a thickness of an under coating layer 3 becomes thicker, λ min is shifted toward the longer wavelength side and when a thickness of an under coating layer 3 becomes thinner, λ min is shifted toward the shorter wavelength side. When the thickness of an under coating layer 3 is constant, λ min is substantially constant even if the thickness of a recording layer 4 and of an upper coating layer 5 vary. When a thickness of a recording layer 4 and of an upper coating layer 5 vary, Rmax1 and Rmax2 vary. In this case, a change of film thickness of the recording layer 4 has a great influence on Rmax2 and a change of film thickness of the upper coating layer 5 has a great influence on Rmax1. In this case, constant $a=0.3, b=0.4, c=-0.1, d=0.2$ and $e=4$. X, Y and Z indicate the ratio of a difference between each film thickness and a standard value to the standard value. Each constant can be derived from spectral reflection when a thickness of each film is changed experimentally. In addition to that, when an optical constant of each wavelength of thin film of each layer is obtained, each constant can be obtained by calculating reflection caused by multiple interference. The constants vary according to standard values of thickness of each layer.

According to the difference between a film thickness of each layer calculated by the above-mentioned method and a target value to be obtained, the film-forming time is changed so as to obtain a desirable film thickness.

As a result, unlike the conventional examples, it is not required to prepare a sample for measuring a film-forming speed for each layer, and therefore production loss can be decreased. Especially, when a film is formed by batch sputtering, the above-mentioned effect is very outstanding. In addition to that, it is not required to change the production conditions tentatively to prepare a sample, and the time required for measuring the film-forming speed can be shortened by measuring a film thickness of three layers at the same time. Consequently, the manufacturing line can be operated more effectively. In addition to that, a film thickness can be measured in actually manufacturing an optical information recording medium. Therefore it is possible to judge the quality of the optical information recording medium to select them.

(Second embodiment)

Figure 4:
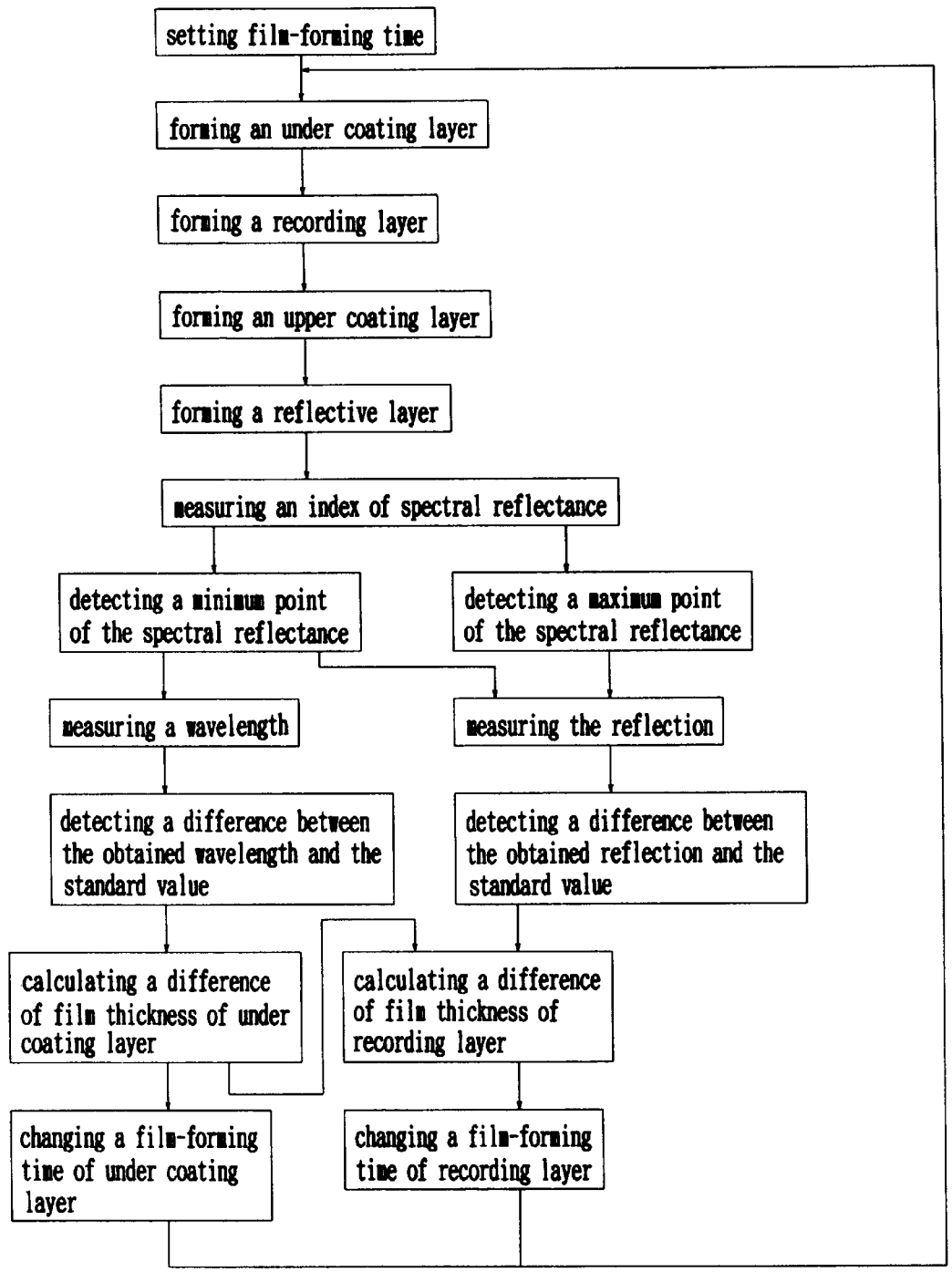
FIG. 4 is a flow chart showing processes of manufacturing an optical information recording medium of second embodiment of this invention.
Figure 5:
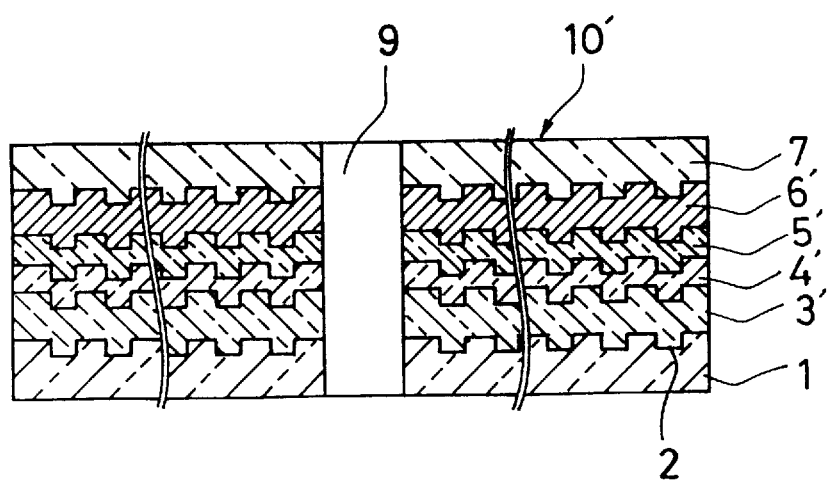
FIG. 5 is a sectional view showing the construction of a general optical information recording medium of second embodiment of this invention.

Referring to FIGS. 4 to 6, the second embodiment concerning a method of measuring a thickness of multilayer film and a method of manufacturing an optical information recording medium in which the above-mentioned method is employed will be explained. FIG. 4 is a flow chart showing steps of a method of manufacturing an optical information recording medium of this invention. FIG. 5 is a sectional drawing showing a general erasing type optical information recording medium. A transparent substrate 1 is disk-like having a central hole 9 and a plurality of toroidal guide grooves 2. On the transparent substrate 1, an under coating layer 3' having a thickness of about 100 nm composed of a thin film of $ZnS-SiO_2$, a recording layer 4' having a thickness of about 20 nm composed of an alloy film of GeSbTe, an upper coating film 5' having a thickness of about 20 nm composed of thin film of $ZnS-SiO_2$, and a reflective layer 6' having a thickness of about 100 nm composed of Al alloy thin film are formed in sequence by a sputtering method. Further, on the reflective layer 6' a resin protective layer 7 is formed. FIG. 6 is a graph showing an example of measurements of spectral reflection obtained by a spectrometer of an optical information recording medium having a construction shown by FIG. 5.

As shown in FIG. 4, the film-forming time of each film is set under predetermined conditions. Then, an under coating layer 3', a recording layer 4', an upper coating layer 5' and a reflection layer 6' are formed on a transparent substrate 1 in sequence according to the predetermined film-forming time of each film. Spectral reflection from a side of the substrate is measured by spectrometer at conditions such that the wavelength is in a range between 350 nm and 860 nm, and the wavelength interval is 5 nm. FIG. 6 shows the results of the measurement.

A minimum value and a maximum value of the spectral reflection are detected according to the obtained results of the measurement. λ which is a wavelength at a maximum value of the spectral reflection is measured and is compared with a predetermined-standard value of the wavelength to obtain a difference, Δλ. At the same time, a reflectance Rmax at maximum value and Rmin at minimum value of the spectral reflection are measured and are compared with a predetermined-standard value of the reflectance to obtain a difference, Δ (Rmax−Rmin). In this case, the standard value is a wavelength at a maximum value of the spectral reflection and reflectance at a maximum value and a minimum value of the spectral reflection when each film is formed to meet a predetermined design value.

According to the above-mentioned measurements, the thickness of an under coating layer 3', a recording layer 4' of optical recording medium 10' are calculated. A method of calculating is as follows. Z(%), a difference between a film thickness of under coating layer 3' and the standard value, that is, 100 nm, X(%), a difference between a film thickness of the recording layer 4' and the standard value, that is, 20 nm according to following formulas, 4 and 5.

$$\Delta \lambda = fZ \qquad (4)$$

$$\Delta(Rmax - Rmin) = gZ + hX \qquad (5)$$

[Formula]

The formulas are derived as follows. When a thickness of an under coating layer 3' becomes thicker, λ is shifted toward the longer wavelength side and when a thickness of an under coating layer 3' becomes thinner, λ is shifted toward the shorter wavelength side. When the thickness of an under coating layer 3' is constant, λ is substantially constant even if the thickness of a recording layer 4' and of an upper coating layer 5' vary. When a thickness of a recording layer 4' vary, Rmax−Rmin vary. In this case, constant f=2.5, g=0.22, and h=0.34. X and Z indicate the ratio of a difference between each film thickness and a standard value to the standard value. Each constant can be derived from spectral reflection when a thickness of each film is changed experimentally. In addition to that, when an optical constant of each wavelength of thin film of each layer is obtained, each constant can be obtained by calculating reflection caused by multiple interference. The constants vary according to standard values of thickness of each layer.

According to the difference between a film thickness of each layer calculated by the above-mentioned method and a target value to be obtained, the film-forming time is changed so as to obtain a desirable film thickness.

(Third embodiment)

Figure 7:
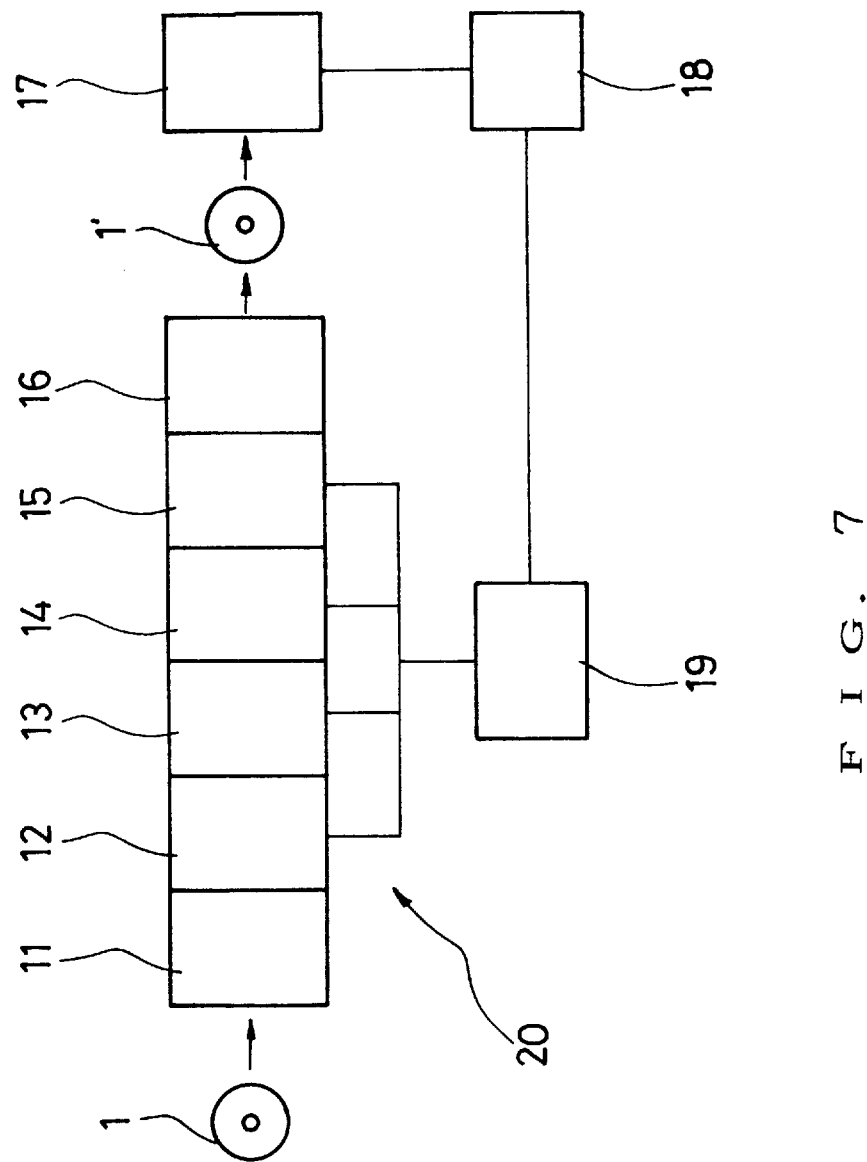
FIG. 7 is a schematic view showing essential parts of the apparatus for forming an optical information recording medium of this invention.

The third embodiment concerning an apparatus for manufacturing an optical information recording medium in which the above-mentioned method of measuring a film thickness of the multilayer thin film is employed will be explained referring to FIGS. 2, 5 and 7. As shown in FIG. 7, an optical information recording medium apparatus 20 comprises a substrate input chamber 11, an under coating layer film-forming chamber 12, a recording layer film-forming chamber 13, an upper coating layer film-forming chamber 14, a reflective layer film-forming chamber 15, a substrate output chamber 16, spectroscope 17, processing unit 18 and film-forming condition control unit 19.

The operation of the apparatus for manufacturing an optical information recording medium having the above-mentioned construction will be explained. A transparent substrate 1 of the optical information recording medium 10 is transferred from the substrate input chamber 11, and four layers, that is an under coating layer 3, a recording layer 4, an upper coating layer 5 and a reflective layer 6, are formed in sequence in the under coating layer film-forming chamber 12, the recording layer film-forming chamber 13, the upper layer film-forming chamber 14 and the reflective layer film-forming chamber 15 respectively. Then, the substrate 1' on which each thin film is formed is taken out from the substrate output chamber 16. In each film-forming chamber 12 to 15, gas flow rate, pressure, sputtering power and time are controlled to be predetermined value and under the above-mentioned predetermined conditions, a film is formed by sputtering method.

The spectroscope 17 measures the spectral reflectance from the side opposite to the surface of the substrate 1' on which a film is formed. The processing unit 18 having CPU and memory performs a process as follows:

(a) detecting a minimum value and a maximum value of the spectral reflection measured by the spectroscope 17;

(b) comparing the wavelength λ min in the minimum value of the spectral reflection with the predetermined standard value to obtain the difference Δλ min;

(c) comparing the reflection in the maximum value, Rmax1 and Rmax2 with the predetermined standard value to obtain the difference ΔRmax1 and ΔRmax2;

(d) obtaining the difference between a thickness of the under coating layer 3 of the optical information recording medium 10 and a standard value based on the above-mentioned predetermined calculation formula and the obtained Δλ min;

(e) obtaining the difference between a thickness of the recording layer 4 and the standard value, and a thickness of the upper coating layer 5 and the standard value based on the ΔRmax1, ΔRmax2 and the above-mentioned predetermined calculation formula; and (f) calculating a film-forming time to form a desirable film-thickness based on the difference between a thickness of each film and the standard value.

In another case, the processing unit 18 performs a process as follows;

(a) detecting a minimum value and a maximum value of the spectral reflection measured by the spectroscope 17;

(b) comparing the wavelength λ in the maximum value of the spectral reflection with the predetermined standard value to obtain the difference Δλ;

(c) comparing the reflection difference between the maximum value Rmax and the minimum value Rmin with the predetermined standard value to obtain the difference Δ (Rmax−Rmin);

(d) obtaining the difference between a thickness of the under coating layer 3' of the optical information recording medium 10 and a standard value based on the above-mentioned predetermined calculation formula and the obtained Δλ;

(e) obtaining the difference between a thickness of the recording layer 4' and the standard value based on the Δ (Rmax−Rmin) and the above-mentioned predetermined calculation formula; and (f) calculating a film-forming time to form a desirable film-thickness based on the difference between a thickness of each film and the standard value.

According to the obtained result, the film-forming time set by the film-forming condition control unit 19 is changed.

According to the apparatus for manufacturing the optical information recording medium apparatus of this invention, it is not required to prepare a sample for measuring a film-forming speed for each layer, therefore production loss can be decreased. Especially, when a film is formed by batch sputtering, the above-mentioned effect is very outstanding. In addition to that, it is not required to change the production conditions tentatively to prepare a sample and the time required for measuring film-forming speed can be shortened by measuring a film thickness of three layers at the same time. Consequently, the manufacturing line can be operated more effectively. In addition to that, a film thickness can be measured in actually manufacturing an optical information recording medium. Therefore it is possible to judge the quality of the optical information recording medium to select them.

In the embodiments, a film-forming time is changed to form a desirable film thickness of each thin film, but the electric power of the sputtering and film-forming speed may be changed as well as instead. Further, instead of measuring the spectral reflectance of the optical information recording medium, the spectral reflectance of a sample composing a substrate on which a film is formed at the same time when a film is formed on the substrate of the information recording medium may be measured. The spectral reflectance measurement may be performed on a predetermined number of pieces in samples or on every piece of a sample.

When an interval of measured wavelength of the spectral reflectance is wide, or the accuracy of measuring a film thickness becomes worse. For example, in this case of the under coating layer 3, the difference of λ min, that is 20 nm, is equivalent to about 5% of film thickness. Consequently, when the required measuring accuracy of the film thickness is 5%, it is preferable that the measured wavelength interval is less than 10 nm, which is half of the difference of λ min.

In the case of the under coating layer 3, 3' and the upper coating layer 5 composed of several layers having similar optical constants, the total thickness of them is measured by the above-mentioned method.

This invention may be embodied in other specific forms without departing from the spirit or essential characteristics thereof. The embodiments disclosed in this application are to be considered in all respects as illustrative and not restrictive, the scope of the invention being indicated by the appended claims rather than by the foregoing description, and all change which come within the meaning and range of equivalency of the claims are intended to be embraced therein.

What is claimed is:

1. A method of measuring a film thickness of a multilayer thin film composed of a plurality of component thin films having different optical constants respectively formed on a substrate, comprising the steps of:

(a) measuring spectral reflection of said multilayer thin film;

(b) comparing the measured value of the spectral reflection of said multilayer thin film with a predetermined standard value; and (c) calculating a thickness of each component film based on the difference between said measured value of the spectral reflection of said multilayer thin film and said predetermined standard value, wherein, said thickness of each component film is calculated by detecting an extremal value of the measured spectral reflection of said multilayer film and detecting a difference between at least one of the reflection in the extremal value of the spectral reflection and the standard value, and the wavelength in the extremal value of the spectral reflection and the standard value.

2. A method of measuring a film thickness of a multilayer thin film as claimed in claim 1, wherein a thickness of a component thin film which is positioned as a first layer from a side of measuring the spectral reflection of multilayer thin film is calculated based on a difference between the wavelength in a minimum value of the measured spectral reflection and the standard value of the wavelength.

3. A method of measuring a film thickness of a multilayer thin film as claimed in claim 1, wherein thicknesses of component thin film positioned as a second layer and a third layer from a side of measuring the spectral reflection of multilayer thin film are calculated based on a difference between the reflection in a plurality of maximum values of the measured spectral reflection and the standard value of the reflection.

4. A method of measuring a film thickness of a multilayer thin film as claimed in claim 1, wherein a thickness of a component thin film which is positioned as a first layer from a side of measuring the spectral reflection of multilayer thin film is calculated based on a difference between the wavelength in a maximum value of the measured spectral reflection and the standard value of the wavelength.

5. A method of measuring a film thickness of a multilayer thin film as claimed in claim 1, wherein a thickness of a component thin film positioned as a second layer from a side of measuring the spectral reflection of multilayer thin film is calculated based on a difference between the reflection in a maximum value and minimum value of the measured spectral reflection and the standard value of the reflection difference.

6. A method of manufacturing an optical information recording medium having a multilayer thin film composed of a plurality of component thin films having different optical constants respectively formed on a substrate, comprising the steps of:

(a) forming said plurality of component thin films on the substrate or a sample at a predetermined film-forming speed and within a predetermined film-forming time respectively in sequence;

(b) measuring spectral reflection of the multilayer thin film formed on the substrate or on the sample;

(c) comparing the measured value of the spectral reflection and a standard value of the spectral reflection to detect a difference between them, wherein a thickness of individual layers is calculated by detecting an extremal value of the measured spectral reflection of said multilayer film and detecting a difference between at least one of the reflection in the extremal value of the spectral reflection and the standard value, and the wavelength in the extremal value of the spectral reflection and the standard value;

(d) adjusting at least one of said predetermined film-forming speed and said predetermined film-forming time based on the thickness; and (e) forming a subsequent plurality of component thin films with the adjusted film-forming speed or film-forming time on a new substrate in sequence.

7. A method of manufacturing an optical information recording medium as claimed in claim 6, wherein a thickness of a component thin film positioned as a first layer from a side of measuring the spectral reflection of multilayer thin film is calculated based on a difference between the wavelength in a minimum value of the measured spectral reflection and the standard value of the wavelength.

8. A method of manufacturing an optical information recording medium as claimed in claim 6, wherein a thickness of a component thin film positioned as a first layer from a side of measuring the spectral reflection of multilayer thin film is calculated based on a difference between the wavelength in a maximum value of the measured spectral reflection and the standard value of the wavelength.

9. A method of manufacturing an optical information recording medium as claimed in claim 7 or 8, wherein an interval of each measured wavelength is 10 nm or less in measuring the spectral reflection.

10. A method of manufacturing an optical information recording medium as claimed in claim 6, wherein thicknesses of component thin films positioned as a second layer and a third layer from the side of measuring the spectral reflection of multilayer thin film are obtained based on a difference between the reflection in a plurality of maximum values of the measured spectral reflection and the standard value of the reflection.

11. A method of manufacturing an optical information recording medium as claimed in claim 6, wherein a thickness of a component thin film positioned as a second layer from the side of measuring the spectral reflection of multilayer thin film is calculated based on a difference between the reflection in a maximum value and a minimum value of the measured spectral reflection and the standard value of the reflection difference.

12. A method of manufacturing an optical information recording medium as claimed in claim 10 or 11, wherein an interval of each measured wavelength is 10 nm or less in measuring the spectral reflection.

13. A method of manufacturing an optical information recording medium having a multilayer thin film composed of a plurality of component thin films having different optical constants respectively formed on a substrate, comprising the steps of (a) forming said plurality of component thin films on the substrate, or the substrate and a sample at a predetermined film-forming speed and within a predetermined film-forming time respectively in sequence;

(b) measuring spectral reflection of the multilayer thin film formed on the substrate or on the substrate and the sample;

(c) comparing the measured value of the spectral reflection and the standard value of the spectral reflection to detect the difference between them, wherein a thickness of individual layers is calculated by detecting an extremal value of the measured spectral reflection of said multilayer film and detecting a difference between at least one of the reflection in the extremal value of the spectral reflection and the standard value, and the wavelength in the extremal value of the spectral reflection and the standard value; and (d) judging the quality of the multilayer thin film formed on the substrate based on the thickness.

14. A method of manufacturing an optical information recording medium as claimed in claim 13, wherein a thickness of a component thin film positioned as a first layer from a side of measuring the spectral reflection of multilayer thin film is calculated based on a difference between the wavelength in a minimum value of the measured spectral reflection and the standard value of the wavelength.

15. A method of manufacturing an optical information recording medium as claimed in claim 13, wherein a thickness of a component thin film positioned as a first layer from a side of measuring the spectral reflection of multilayer thin film is calculated based on a difference between the wavelength in a maximum value of the measured spectral reflection and the standard value of the wavelength.

16. A method of manufacturing an optical information recording medium as claimed in claim 14 or 15, wherein an interval of each measured wavelength is 10 nm or less in measuring the spectral reflection.

17. A method of manufacturing an optical information recording medium as claimed in claim 13, wherein thicknesses of component thin films positioned as a second layer and a third layer from the side of measuring the spectral reflection of multilayer thin film are obtained based on a difference between the reflection in a plurality of maximum values of the measured spectral reflection and the standard value of the reflection.

18. A method of manufacturing an optical information recording medium as claimed in claim 13, wherein a thickness of a component thin film positioned as a second layer from the side of measuring the spectral reflection of multilayer thin film is calculated based on a difference between the reflection in a maximum value and a minimum value of the measured spectral reflection and the standard value of the reflection difference.

19. A method of manufacturing an optical information recording medium as claimed in claim 17 or 18, wherein an interval of each measured wavelength is 10 nm or less measuring the spectral reflection.

20. An apparatus for manufacturing an optical information recording medium composed of a plurality of component thin films having different optical constants respectively formed on a substrate, comprising:

(a) means for forming said plurality of component thin films on the substrate or a sample at a predetermined film-forming speed and within a predetermined film-forming time in sequence;

(b) means for measuring spectral reflection of the multilayer thin film formed on the substrate or on the sample;

(c) means for storing a standard value of a predetermined spectral reflection;

(d) means for detecting an extremal value of the measured spectral reflection of said multilayer film and a means for calculating a thickness of individual layers based on a difference between at least one of a reflection in the extremal value of the spectral reflection and the standard value, and a wavelength in the extremal value of the spectral reflection and the standard value; and (e) means for compensating at least one of said predetermined film-forming speed and said predetermined film-forming time based on the thickness.

21. An optical information recording medium apparatus as claimed in claim 20, further comprising a means for estimating a thickness of a component thin film positioned as a first from the side of measuring the spectral reflection of the multilayer thin film based on the difference between a wavelength in the minimum value of the measured spectral reflection and the standard value of the wavelength and a means for compensating at least one of the film-forming speed and the film-forming time of the first thin layer based on the difference between the estimated value of the film thickness and the desirable film thickness.

22. An optical information recording medium apparatus as claimed in claim 20, further comprising a means for estimating a thickness of a component thin film positioned as a first layer from the side of measuring the spectral reflection of the multilayer thin film based on the difference between a wavelength in the maximum value of the measured spectral reflection and the standard value of the wavelength and a means for compensating at least one of the film-forming speed and the film-forming time of the first thin layer based on the difference between the estimated value of the film thickness and the desirable film thickness.

23. An optical information recording medium apparatus as claimed in claim 21 or 22, wherein an interval of each measured wavelength is 10 nm or less in measuring the spectral reflection.

24. An optical information recording medium apparatus as claimed in claim 20, further comprising a means for estimating thicknesses of component thin films positioned as a second layer and a third layer from the side of measuring the spectral reflection of the multilayer thin film based on the difference between a reflection in a plurality of the maximum values of the measured spectral reflection and the standard value of the reflection and a means for compensating at least one of a film-forming speed and a film-forming time of the second and third thin layers based on the difference between the estimated value of the film thickness and the desirable film thickness.

25. An optical information recording medium apparatus as claimed in claim 20, further comprising a means for estimating a thickness of a component thin film positioned as a second layer from the side of measuring the spectral reflection of the multilayer thin film based on the different between a reflection in a maximum value and a minimum value of the measured spectral reflection and the standard value of the reflection difference and a mean for compensating at least one of the film-forming speed and film-forming time of the second layers based on the difference between the estimated value of the film thickness and the desirable film thickness.

26. An apparatus for manufacturing an optical information recording medium composed of a plurality of component thin films having different optical constants respectively formed on a substrate comprising:

(a) means for forming said plurality of component thin films on the substrate or the substrate and a sample with the predetermined film-forming speed and within a predetermined film-forming time in sequence;

(b) means for measuring spectral reflection of the multilayer thin film formed on the substrate or on the sample;

(c) means for storing a standard value of a predetermined spectral reflection;

(d) means for detecting an extermal value of the measured spectral reflection of said multilayer film and a mean for calculating a thickness of individual layers based on a difference between at least one of a reflection in the extermal value of the spectral reflection and the standard value, and a wavelength in the extermal value of the special reflection and the standard value; and (e) means for judging a quality of the multilayer thin formed on the substrate based on the thickness.

27. An optical information recording medium apparatus as claimed in claim 26, further comprising a means for estimating a thickness of a component thin film positioned as a first layer from the side of measuring the spectral reflection of the multilayer thin film based on the difference between a wavelength in the minimum value of the measured spectral reflection and standard value of the wavelength and a means for compensating at least one of the film-forming speed and the film-forming time of the first thin layer based on the difference between the estimated value of the film thickness and the desirable film thickness.

28. An optical information recording medium apparatus as claimed in claim 26, further comprising a means for estimating a thickness of a component thin film positioned as a first layer from the side of measuring the spectral reflection of the multilayer thin film based on the difference between a wavelength in the maximum value of the measured spectral reflection and the standard value of the wavelength and a means for compensating at least one of the film-forming speed and the film-forming time of the first thin layer based on the difference between the estimated value of the film thickness and the desirable film thickness.

29. An optical information recording medium apparatus as claimed in claim 27 or 28 wherein an interval of each measured wavelength is 10 nm or less in measuring the spectral reflection.

30. An optical information recording medium apparatus as claimed in claim 26, further comprising a means for estimating thicknesses of component thin films positioned as a second layer and a third layer from side of measuring the spectral reflection of the multilayer thin film based on the difference between a reflection in a plurality of the maximum values of the measured spectral reflection and the standard value of the reflection and a means for compensating at least one of a film-forming speed and a film-forming time of the second and third layers based on the difference between the estimated value of the film thickness and the desirable film thickness.

31. An optical information recording medium apparatus as claimed in claim 26, further comprising a means for estimating a thickness of a component thin film positioned as a second layer from the side of measuring the special reflection of the multilayer thin film based on the difference between a reflection in a maximum value and a minimum value of the measured spectral reflection and the standard value of the reflection difference and a means for compensating at least one of the film-forming speed and the film-forming time of the second thin layer based on the difference between the estimated value of the film thickness and the desirable film thickness.

* * * * *